H. T. NEWBIGIN.
FILM LUBRICATED THRUST AND JOURNAL BEARING.
APPLICATION FILED APR. 17, 1916.

1,275,079.

Patented Aug. 6, 1918.
3 SHEETS—SHEET 1.

Witnesses:
M. E. McDade
[signature]

Inventor
Henry T. Newbigin
by
[signature]
Attorney

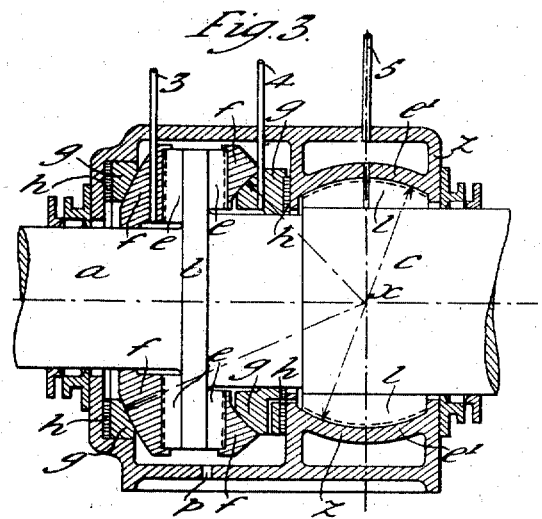

H. T. NEWBIGIN.
FILM LUBRICATED THRUST AND JOURNAL BEARING.
APPLICATION FILED APR. 17, 1916.
1,275,079.
Patented Aug. 6, 1918.
3 SHEETS—SHEET 3.
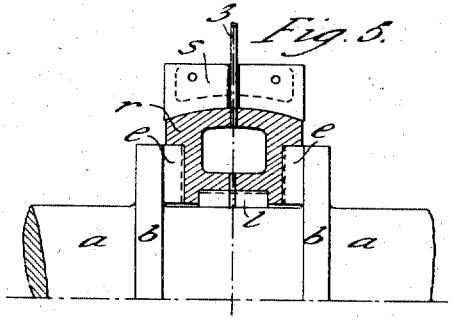
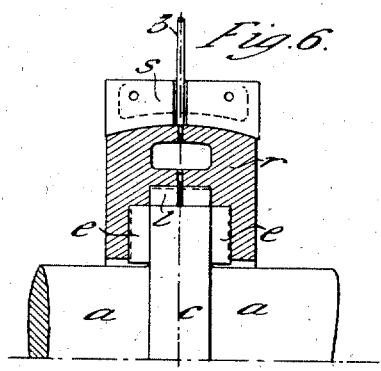
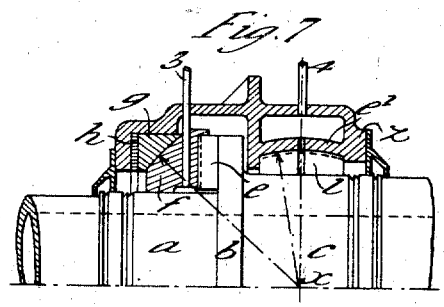
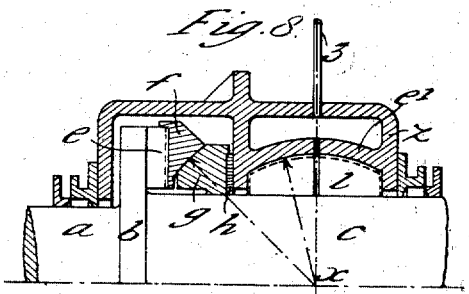

UNITED STATES PATENT OFFICE.

HENRY THORNTON NEWBIGIN, OF NEWCASTLE-UPON-TYNE, ENGLAND.

FILM-LUBRICATED THRUST AND JOURNAL BEARING.

1,275,079.  Specification of Letters Patent.  Patented Aug. 6, 1918.

Application filed April 17, 1916. Serial No. 91,741.

*To all whom it may concern:*

Be it known that I, HENRY THORNTON NEWBIGIN, a subject of the King of Great Britain, residing in Newcastle-upon-Tyne, England, have invented certain new and useful Improvements in Film-Lubricated Thrust and Journal Bearings, of which the following is a specification.

Thrust bearings in which one of the bearing surfaces is subdivided into segments pivoted at their backs for the purpose of facilitating the entrance of the lubricant between the rubbing surfaces, are described in British specification No. 875 of 1905, and journal bearings in which the bearing surfaces are subdivided and pivoted for a like purpose are described in British specification No. 23496 of 1911. Hitherto bearings of these kinds have been made separately, that is to say, where both types of bearings have been used upon one shaft, a thrust bearing as described above has been placed at one point in the length of the shaft and a journal bearing as described has been placed at another point. I have found it advantageous to combine the two bearings in one housing and thereby reduce the length of the shaft occupied, secure greater freedom for the automatic adjustment of the bearing surfaces and simplification of the lubrication arrangement.

British specification No. 953 of 1913 described the advantages of the pivoted type of thrust bearing when applied to steam turbines and shows how by their use the length of the turbine may be shortened, a balancing piston may be omitted, economy increased and cost reduced. The present invention as applied to steam turbines permits the length of the machine to be still further reduced.

The reduction in the length of the bearing resulting from the invention is also valuable for other applications as, for example, where the bearing is used to take the propeller thrust on a mechanically propelled ship.

In thrust bearings fitted with pivoted segments it is obviously important that the load shall be equally or fairly equally distributed around the ring of segments and for this purpose the member containing the segments is usually mounted on a spherical seat. Similarly, in journal bearings the segments may be made spherical on their pivoting surface so as to distribute the pressure equally along the segments parallel with the axis of the shaft. Now where the thrust and journal bearings are separate the centers of these spheres or partial spheres do not coincide and there is consequently not a true swiveling action under the strains to which the shaft or the supports are subjected, whereas by combining the two bearings in one housing, as is done by the present invention, all the spherical surfaces may be generated from a common center, thereby securing a complete swiveling action instead of only an approximate adjustment.

According to the invention, any suitable construction of combined bearing may be employed in which the pivoted or swiveling segments both to take the thrust and to hold the shaft in position axially are arranged in the one housing, and the combined bearing may be arranged to carry a horizontal, an inclined, or a vertical shaft. It is, however, preferable, as indicated above, that the member or members carrying the pivoted or swiveling bearing segments or the segments themselves should be mounted in spherical seatings, all of which, though they may be of different diameter, are generated from the same center.

The invention will be described with reference to the accompanying drawings, which show, by way of example, various forms of the invention.

Figs. 2 to 4 are similar views, and Figs. 5 and 6 half longitudinal sections, showing modified forms of bearing adapted for a reversible end thrust.

Figs. 7 and 8 are half longitudinal sections showing bearings adapted to take the end thrust in one direction only.

Figure 1:
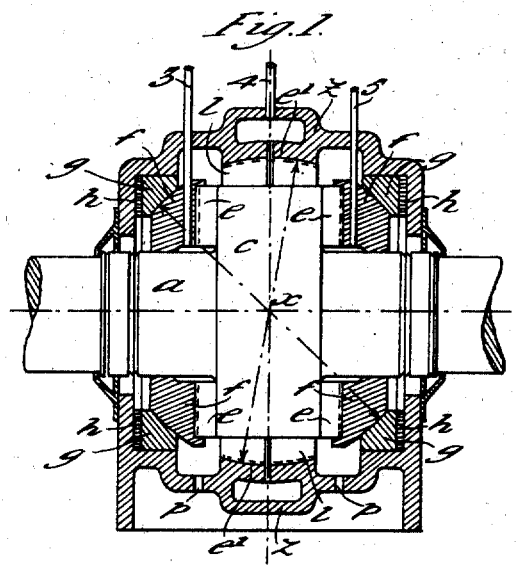
Figure 1 is a longitudinal section through one form of bearing adapted to take the thrust in both directions.

As shown in Fig. 1 of the drawings, the shaft $a$ is formed with a wide flange or collar $c$ adapted to engage pivoted segments $e$ on either side designed to take up the thrust in either direction, such pivoted segments $e$ being carried by members $f$ of partially spherical shape seated in correspondingly spherical seatings $g$ in the housing $z$. At the same time the periphery of the flange or collar $c$ is engaged or supported by the journal segments $l$ which are made exteriorly with pivotal portions of partially spherical shape which rest directly in the spherical seating $e'$ formed in the housing $z$. Or the journal segments $l$ may be carried by a partially spherical supporting member mounted in the housing z. In either case all the spherical seatings are preferably generated from the same center, which is for preference the point x, to permit of swiveling of the shaft in the bearing.

Oil may be admitted to the bearings by the pipes 3, 4 and 5, and drawn off through the openings p in the bottom of the housing.

Figure 2:
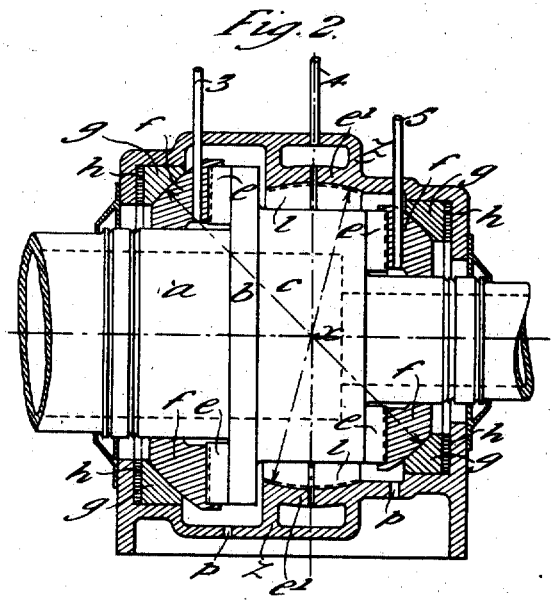

In Fig. 2 a modified construction is shown which is in general similar to that of Fig. 1, but is applicable where the shaft is of different sizes on the two sides of the bearing or where the thrust in one direction is greater than in the other. In this arrangement, there is provided at the side of the collar c adjacent to that part of the shaft of larger diameter, or at that side of the collar which has to take the greater thrust, an extended collar b of larger diameter adapted to bear against the pivoted bearing segments e which are mounted in the carrying member f which at this side of the bearing is made of corresponding size to the collar b.

The end thrust in the other direction is taken by the side of the collar c as in Fig. 1.

The spherical seatings of the two carrying members f, while being struck from the same center, are of different radii to permit of the member f at the left hand side being made of larger diameter.

The arrangement of the journal bearing is exactly the same as in Fig. 1.

To permit of the adjustment of the axial portion of the shaft and the oil clearances, the spherical seatings g may be made separately from the housing z and adjusted in position therein by packing rings h which may be wholly or partially in the form of thin laminations as is common in steam turbine work.

Another arrangement of bearing according to the invention is shown in Fig. 3. In this arrangement the journal bearing is on the shaft c and the thrust in both directions is transmitted through the collar b. As shown, the journal bearing is mounted at one end of the housing and is supported on pivoted segments l exactly as in Fig. 1, and the thrust collar b is mounted at the other end of the housing, pivoted segments e mounted on carrying members f having spherical seatings g being arranged on either side thereof to take the thrust. As in Fig. 2, all the spherical seatings while being struck from the same center, are of different radii.

Axial adjustment of the shaft as in Fig. 2 is effected by the packing rings h.

Fig. 4 shows another modified construction of bearing. In this arrangement the journal bearing is constructed as in the arrangements previously described but the end thrusts are transmitted by two collars b arranged at opposite ends of the bearing and are correspondingly taken up by two sets of pivoted segments e mounted in the carrying members f which are spherically seated on the seatings g arranged at each side of the journal bearing. Such a bearing is preferably made symmetrical, the spherical seatings being centered from the center of the journal bearing and the radii of the spherical seatings for the carrying members f being made equal.

In the arrangements shown in Figs. 5 and 6, the bearing swivels as a whole instead of merely the independent seats. As shown in Fig. 5, the frame r of the bearing is formed with a spherical shaped periphery which is seated in the correspondingly spherical shaped seating s. The journal bearing is formed by the pivoted segments l arranged interiorly of the frame r, and the thrust bearing by the pivoted segments e arranged at either side of the frame r, and adapted to engage the thrust collars b formed on the shaft a at either side of the bearing.

In Fig. 6 the frame r is mounted in the spherical seating s as in Fig. 5, but the frame in this case is arranged to surround a single collar c and to take the thrusts internally. The arrangement of the bearing segments is very similar to that shown in Fig. 1, the pivoted segments for the journal bearing being arranged in the frame r around the collar c and those for the thrust bearings being arranged in the frame at either side of the collar.

In Figs. 7 and 8 bearings are shown of a type adapted to take an end thrust in one direction only. In Fig. 7 the thrust is toward the left and in Fig. 8 toward the right.

The bearing shown in Fig. 7 is almost identical with that shown in Fig. 2 (similar parts being indicated by the same letters in both figures) except that the thrust bearing shown at the right hand side of the journal bearing c is dispensed with.

The bearing shown in Fig. 8 is also similar to that shown in Fig. 3 (the same reference letters being used for similar parts) except that the parts of the bearing to take the thrust to the left are dispensed with.

In Figs. 1, 2 and 7 oil throwers are shown at the ends of the bearing to prevent the escape of oil along the shaft, while glands are shown in Figs. 3, 4 and 8 for the same purpose.

In all cases sufficient play or clearance is allowed to give the maximum of swiveling necessary. In practice this is usually very small, for example, in a horizontal steam turbine it is that due to the sag of the shaft from the weight of the rotor or that due to distortion in the frame of the turbine from the heat of the steam. Such oil throwers and glands are not, however, always necessary and are not fitted where a large swiveling angle is required.

It will of course be understood that the bearings are usually made in halves for the purpose of allowing the shaft being placed in position, the division being usually on a plane containing the axis of the shaft. In some cases the housing is divided on a plane at right angles to the axis of the shaft for a similar purpose, or for the purpose of end adjustment, or both, while still remaining essentially one housing.

Having thus described the nature of the said invention and the best means I know of carrying the same into practical effect, I claim:—

1. The combination of a casing, with a single journal bearing and a double-acting thrust bearing all contained within the casing, the fixed rubbing surface of each bearing comprising a plurality of segmental blocks mounted pivotally in the casing to adjust themselves to the coöperating rotating surface.

2. The combination of a casing, with a single journal bearing and a double-acting thrust bearing all contained within the casing, the fixed rubbing surface of each bearing embodying a plurality of segmental blocks, and spherical seats on which said blocks are mounted whereby the blocks are capable of adjusting themselves in relation to the coöperating rotating surface.

3. The combination of a casing, and combined journal and thrust bearings contained therein, the fixed rubbing surface of each bearing comprising a plurality of segmental blocks, and concentric spherical seats on which the blocks are mounted whereby the blocks of each bearing are capable of adjusting themselves in relation to the respective coöperating rotating surfaces.

4. The combination of a casing, and combined journal and thrust bearings contained therein, each bearing having a fixed rubbing surface comprising a plurality of segmental blocks, a spherical seat in the casing on which the blocks of the journal bearing are mounted whereby the blocks of said bearing are capable of adjusting themselves in relation to the coöperating rotating surface, and carrier members in the casing having spherical seats on which the blocks of the thrust bearing are mounted whereby the latter blocks are capable of adjusting themselves in relation to the coöperating rotating surface, the spherical seats of the carrier members being concentric with the spherical seat first mentioned.

5. In a combined journal and thrust bearing for a shaft, a housing having an internal spherically shaped seating, a set of spherical seatings mounted within the housing and concentric with the first said seating, a series of pivoted segmental blocks mounted in the first said seating and adapted to engage a longitudinally directed portion of the shaft to form the fixed surface of the journal bearing, a second series of pivoted segmental blocks mounted in the said set of spherical seatings and adapted to engage a surface on a collar on the shaft to form a fixed thrust bearing surface.

6. In a combined journal and thrust bearing for a shaft, a housing having an internal spherically shaped seating, a plurality of sets of seatings mounted within the housing concentrically with the first-named seating, a series of pivoted segmental blocks mounted in the first said seating and adapted to engage a longitudinally directed portion of the shaft to form the fixed surface of the journal bearing, and a plurality of sets of pivoted segmental pads corresponding in number to the said sets of seatings, the pads being mounted one in each of the last-named seatings and adapted to engage rotating surfaces on the shaft and form fixed thrust bearing surfaces.

In testimony whereof I have signed my name to this specification in the presence of the two subscribing witnesses.

HENRY THORNTON NEWBIGIN.

Witnesses:
PERCY CORDER,
ROBERT WILLIAM RIDLER.